US012114376B2

(12) United States Patent
Fujishima et al.

(10) Patent No.: US 12,114,376 B2
(45) Date of Patent: Oct. 8, 2024

(54) RADIO COMMUNICATION SYSTEM AND COMMUNICATION METHOD

(71) Applicant: NTT DOCOMO, INC., Tokyo (JP)

(72) Inventors: Daisuke Fujishima, Tokyo (JP); Ashiq Khan, Tokyo (JP); Srisakul Thakolsri, Munich (DE); Malla Reddy Sama, Munich (DE); Irfan Ali, Istanbul (AR)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/315,358

(22) PCT Filed: Jul. 4, 2017

(86) PCT No.: PCT/JP2017/024471
§ 371 (c)(1),
(2) Date: Jan. 4, 2019

(87) PCT Pub. No.: WO2018/008629
PCT Pub. Date: Jan. 11, 2018

(65) Prior Publication Data
US 2019/0313467 A1 Oct. 10, 2019

(30) Foreign Application Priority Data

Jul. 8, 2016 (JP) .............................. JP2016-136420

(51) Int. Cl.
*H04W 76/10* (2018.01)
*H04W 8/24* (2009.01)
(Continued)

(52) U.S. Cl.
CPC ............. *H04W 76/10* (2018.02); *H04W 8/24* (2013.01); *H04W 16/02* (2013.01); *H04W 76/15* (2018.02); *H04W 92/06* (2013.01); *H04W 92/24* (2013.01)

(58) Field of Classification Search
CPC ....... H04W 76/10; H04W 8/24; H04W 16/02; H04W 48/18; H04W 16/10;
(Continued)

(56) References Cited

U.S. PATENT DOCUMENTS

2016/0353465 A1* 12/2016 Vrzic .................... H04W 12/06
2018/0288670 A1* 10/2018 Li .......................... H04W 8/186
(Continued)

OTHER PUBLICATIONS

CATT; "Service Triggered Network Slicing Selection Procedure"; SA WG2 Meeting #115 S2-162636; Nanjing, P.R. 3hina, May 23-27, 2016 (Year: 2016).*
(Continued)

*Primary Examiner* — Umair Ahsan
(74) *Attorney, Agent, or Firm* — Osha Bergman Watanabe & Burton LLP

(57) ABSTRACT

A radio communication system includes user equipment, a call control apparatus, and a plurality of communication apparatuses, wherein each communication apparatus belongs to one of a plurality of groups, wherein the user equipment transmits, to the call control apparatus, a first access request signal including a group specifying information for specifying one group and a communication destination identifier, wherein the call control apparatus transmits, to the communication apparatus belonging to the one group specified by the group specifying information, a second access request signal including the communication destination identifier, and wherein the communication apparatus establishes a communication path between a communication destination indicated by the communication destination identifier included in the second access request signal and the user equipment.

2 Claims, 10 Drawing Sheets

(51) Int. Cl.
   *H04W 16/02* (2009.01)
   *H04W 76/15* (2018.01)
   *H04W 92/06* (2009.01)
   *H04W 92/24* (2009.01)

(58) Field of Classification Search
   CPC . H04W 28/0247; H04W 76/11; H04W 60/00; H04L 41/5009; H04L 41/5054
   See application file for complete search history.

(56) References Cited

U.S. PATENT DOCUMENTS

| | | | | |
|---|---|---|---|---|
| 2019/0007899 A1* | 1/2019 | Vrzic | ................... | H04W 8/02 |
| 2019/0141760 A1* | 5/2019 | Stille | ................... | H04W 76/12 |
| 2019/0159117 A1* | 5/2019 | Kuge | ................... | H04W 48/18 |

OTHER PUBLICATIONS

Extended European Search Report issued in the counterpart European Patent Application No. 17824232.7, mailed Apr. 23, 2019 (9 pages).

CATT; "Service Triggered Network Slicing Selection Procedure"; SA WG2 Meeting #115 S2-162636; Nanjing, P.R. China, May 23-27, 2016 (7 pages).

International Search Report issued for PCT/JP2017/024471, mailed Sep. 19, 2017 (4 pages).

Written Opinion issued for PCT/JP2017/024471, mailed Sep. 19, 2017 (4 pages).

3GPP TR 23.799 V0.5.0; "3rd Generation Partnership Project; Technical Specification Group Services and System Aspects; Study on Architecture for Next Generation System (Release 14)"; May 2016 (178 pages).

Office Action in counterpart Chinese Patent Application No. 201780041087.9 issued on Jun. 2, 2021 (16 pages).

NTT DOCOMO; "Update of Network Slicing Solution 1.3"; SA WG2 Meeting #116, S2-163446; Vienna, AT; Jul. 11-15, 2016 (10 pages).

Office Action in counterpart Chinese Patent Application No. 201780041087.9 issued on Apr. 18, 2022 (19 pages).

ZTE (email discussion convener), Summary of email discussion on Slicing WT1 (i.e. NS_WT_#1) assuming one UE-one slice and fully separated slices (i.e. a basic model), SA WG2 Meeting #116, S2-163508, Vienna, AT, Jul. 11-15, 2016 (7 pages).

Office Action in counterpart Chinese Patent Application No. 201780041087.9 issued on Jul. 27, 2022 (14 pages).

* cited by examiner

ACCESS INFORMATION

| UE TYPE | DCN-ID | SERVICE IDENTIFIER | APN |
|---|---|---|---|
| #1 | #1 | #A | #1 |
| #1 | #1 | #B | #1 |
| #2 | #2 | #A | #2 |
| #2 | #2 | #B | #2 |

FIG.11

ACCESS INFORMATION

| DCN-ID | SERVICE IDENTIFIER | APN |
|---|---|---|
| #1 | #A | #1 |
| #1 | #B | #1 |

FIG.12

ACCESS INFORMATION

| UE TYPE | DCN-ID | APN |
|---|---|---|
| #1 | #1 | #1 |
| #1 | #2 | #1 |
| #2 | #3 | #2 |
| #2 | #4 | #2 |

FIG.14

ACCESS INFORMATION

| DCN-ID | APN |
|---|---|
| #1 | #1 |
| #2 | #1 |

RADIO COMMUNICATION SYSTEM AND COMMUNICATION METHOD

TECHNICAL FIELD

The present invention relates to a radio communication system and a communication method.

BACKGROUND ART

In Long Term Evolution (LTE), a radio communication scheme referred to as 5G has been studied to achieve larger capacity of systems, further acceleration of data transmission speeds, further reduction of latency in radio sections, and the like.

Radio communication systems configured to support 5G radio access technology (new RAT (Radio Access Technology)), evolved E-URTA, and an access technology other than 3GPP (non-3GPP access type) have been studied along with the study of 5G radio communication schemes (for example, see Non-Patent Document 1). According to Non-Patent Document 1, the radio communication system is referred to as a next generation system.

In next generation systems, a scheme referred to as a network slice (NW slice) has been studied that enables resources implementing network functions necessary to provide telecommunication services to be divided into a plurality of services. By using the scheme of the NW slice, a network operator can physically or logically divide various functions of a core network into resources according to required conditions such as QoS and transmission delay. A range of the functions divided by the NW slice is also referred to as a NW slice instance.

PRIOR ART DOCUMENT

Non-Patent Document

Non-Patent Document 1: 3GPP TR23.799 V0.5.0 (2016 05)

SUMMARY OF THE INVENTION

Problem to be Solved by the Invention

However, in the study of 3GPP so far, no technology has been proposed that enables, when a plurality of NW Slices are configured in the same APN, the NW Slices to be appropriately selected.

The disclosed technology has been developed in view of the foregoing circumstance and an object is to provide a technology for enabling NW slices to be appropriately selected when the plurality of NW slices are configured in the same APN.

Means for Solving the Problem

According to the present technology, a radio communication system includes user equipment; one or more call control apparatuses configured to perform call control; and a plurality of communication apparatuses configured to process user data. Each of the plurality of communication apparatuses belongs to one of a plurality of groups which are resource division units. The user equipment includes a first communication processing unit that transmits a first access request signal including group specifying information for specifying one group among the plurality of groups and a communication destination identifier indicating a communication destination of the user data to the call control apparatus. The call control apparatus includes a second communication processing unit that transmits a second access request signal including the communication destination identifier included in the first access request signal to the communication apparatus belonging to one group specified with the group specifying information among the plurality of communication apparatuses communicating with the communication destination indicated by the communication destination identifier included in the first access request signal. The communication apparatus includes a setting unit that establishes a communication path of the user data between the communication destination indicated by the communication destination identifier included in the second access request signal and the user equipment.

Advantage of the Invention

According to the disclosed technology, a technology is provided that is for enabling NW slices to be appropriately selected when the plurality of NW slices are set in the same APN.

BRIEF DESCRIPTION OF DRAWINGS

FIG. 11 is a diagram illustrating an example of access information in which a UE type corresponds to "#1" according to the first embodiment;

FIG. 12 is a diagram illustrating an example of access information according to a second embodiment;

FIG. 14 is a diagram illustrating an example of access information in which a UE type corresponds to "#1" according to the second embodiment.

EMBODIMENTS OF THE INVENTION

Hereinafter, embodiments of the invention are described with reference to the drawings. The embodiments to be described below are merely examples and embodiments to which the invention is applied are not limited to the following embodiments. In the following description, an "NW slice" is used to imply an intention of an "NW slice instance" unless otherwise mentioned.

<System Configuration>

Figure 1:
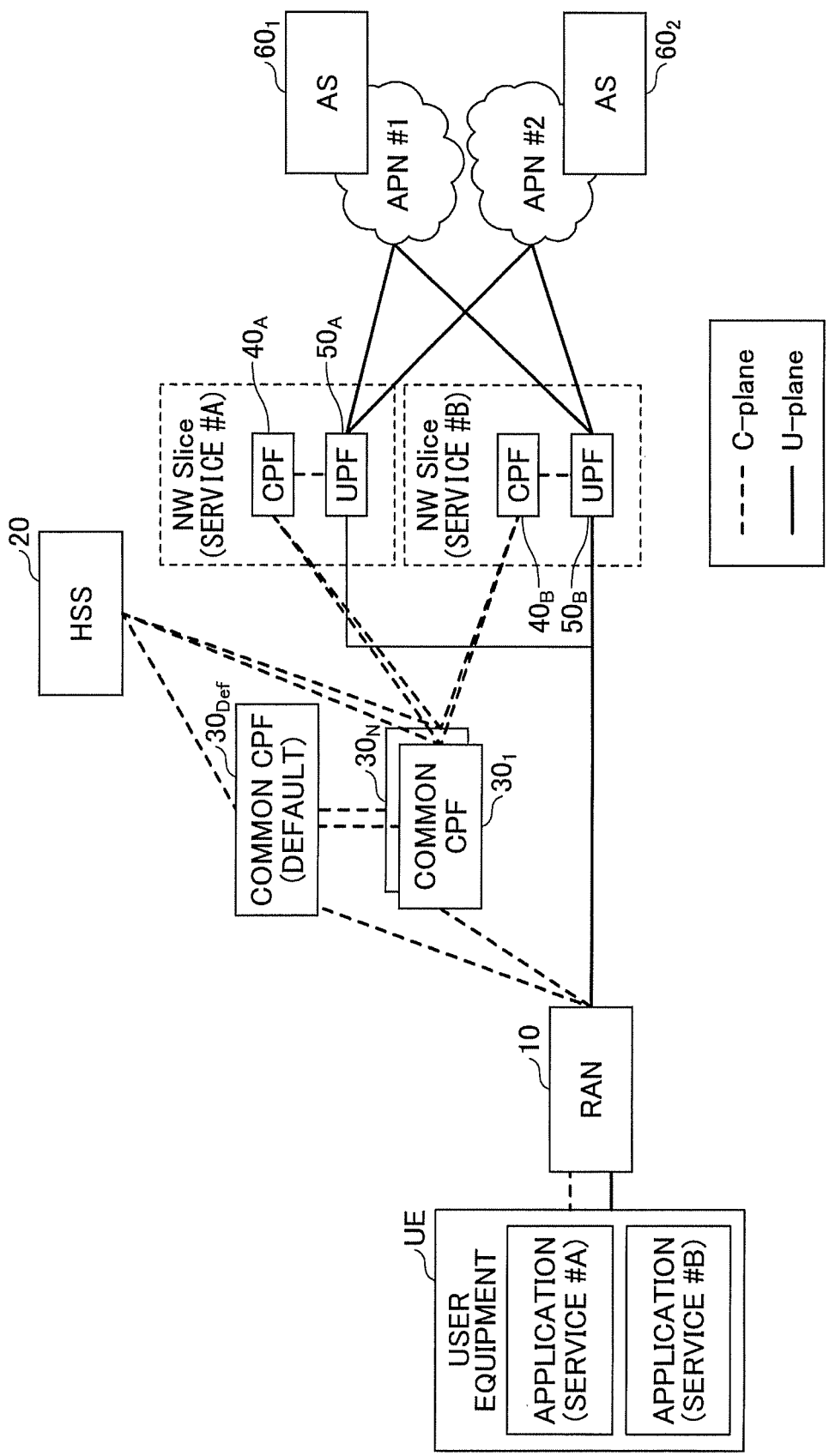
FIG. 1 is a diagram illustrating a configuration example of a radio communication system according to each embodiment.

FIG. 1 is a diagram illustrating a configuration example of a radio communication system according to each embodiment. As illustrated in FIG. 1, the radio communication system according to each embodiment includes user equipment UE, an RAN 10, a home subscriber server (HSS) 20, common CPFs $30_1$ to $_N$, a common CPF (default) $30_{Def}$, a CPF $40_A$ and a UPF $50_A$ included in an NW slice (service #A), a CPF $40_B$ and a UPF $50_B$ included in an NW slice (service #8), an application server (AS) $60_1$ installed in a network of APN #1, and an application server (AS) $60_2$ installed in a network of APN #2. In FIG. 1, one user equipment UE is illustrated, but there may be a plurality of units of user equipment UE. In FIG. 1, two NW slices, the NW slice (service #A) and the NW slice (service #B), are configured, but three or more NW slices may be configured.

Service #A and service #B are intended as being services provided by each NW slice and are, for example, services in which request conditions such as QoS and transmission delay in a U-plane are different. For example, a mobile broadband service (for example, an enhanced mobile broadband service) of low delay and broadband, a critical communication service supporting important communication or the like performed in fire fighting, police, or the like, and IP multimedia subsystem (IMS) audio service can be exemplified.

In the embodiment, when an application related to service #A (hereinafter referred to as an "application (service #A)" is performed by user equipment, a process necessary to establish a communication path with APN #1 is performed by a CPF and a UPF in the NW slice (service #A). In addition, when an application related to service #B (hereinafter referred to as an "application (service #B)" is performed by user equipment, a process necessary to establish a communication path with APN #1 is performed by a CPF and a UPF in the NW slice (service #B).

In the following description, when the common CPF $30_1$ to $_N$ are not particularly distinguished from each other, the common CPFs $30_1$ to $_N$ are referred to as the "common CPFs 30." When the CPF $40_A$ and the CPF $40_B$ are not particularly distinguished from each other, the CPF $40_A$ and the CPF $40_B$ are referred to as the "CPFs 40." When the UPF $50_A$ and the UPF $50_B$ are not particularly distinguished from each other, the UPF $50_A$ and the UPF $50_B$ are referred to as the "UPFs 50."

The user equipment UEs are, for example, a terminal (mobile broadband (MBB) terminal) that frequently transmits and receives a large amount of data, such as a smartphone, and a terminal (MTC terminal) that less frequently transmits and receives only a small amount of data, such as an IoT device. In the embodiment, the units of user equipment include all types of units of user equipment UE. The types of units of user equipment UE are not limited to uses of the units of user equipment UE. For example, a type user equipment may imply a company holding the user equipment.

An application related to service #A and an application related to service #B are installed in the user equipment UE. For example, when service #A is a mobile broadband service of low delay or broadband, a web browser or a moving image browsing application can be exemplified as the application related to service #A. In addition, when service #B is a critical communication service, a call application (for example, a call application capable of notifying of an emergency call) performing important communication can be exemplified as the application related to service #B.

The RAN 10 is an access network including a new RAT, an evolved E-URTA, and an access technology (for example, a WLAN or a fixed access circuit) other than 3GPP.

The HSS 20 is a server that stores subscriber information. The HSS 20 may also be referred to as a subscriber data repository.

The common CPF 30 is an apparatus that performs common call control independent on the NW slice and includes, for example, a mobility management function (MM), an authentication and authorization function (AU), an NW slice selection function (NSSF). The common CFP 30 may also be referred to as a common C-plane network function (CP-NF).

The common CPF (default) $30_{Def}$ is a type of common CPF 30 and is the common CPF 30 first accessed from the RAN 10 when the common CPF $30_1$ to N of access destinations are not recognized (or may not be recognized) on the side of the RAN 10. The common CPF (default) $30_{Def}$ has a function of redirecting access from the RAN 10 to an appropriate common CPF 30. When the common CPF $30_1$ to $_N$ of the access destination can appropriately be selected on the side of the RAN 10, the common CPF (default) $30_{Def}$ may not necessarily be present.

The CPF 40 is an apparatus that performs call processing necessary inside the NW slice and includes, for example, a session management function (SM). The CFP 40 may also be referred to as a CP-NF.

The UPF 50 is an apparatus that processes user data (U-plane signal) and is an apparatus equivalent to a serving gateway (SGW) and a packet data network gateway (PGW) in LTE. The UPF 50 has a function of establishing a communication path of the U-plane in which request conditions of a service to be provided as the NW slice are satisfied between the user equipment UE and the APN in response to an instruction from the CPF 40. The UPF 50 may also be referred to as a U-plane-gateway (UP-GW).

The AS 60 is a server that executes an application for communicating with the user equipment UE. The AS 60 is, for example, a web server, a server used for police, fire fighting, or the like, or any of various servers (for example, a P-CSCF) used for IMS, but the invention is not limited thereto.

The common CPF $30_1$ to $_N$, the common CPF (default) $30_{Def}$, the CPF $40_A$, and CPF $40_B$ may be physical apparatuses or may be logical functions implemented by a virtualization technology. The common CPF $30_1$ to $_N$, the CPF $40_A$, the CPF $40_B$, the UPF $50_A$, and the UPF $50_B$ may be implemented in a physically same apparatus and internal resources (CPU resources and memory resources) may be divided (sliced) for each NW slice through software processing.

Each NW slice illustrated in FIG. 1 includes the CPF 40 and the UPF 50, but the division method in the NW slice is an example and the invention is not limited thereto. For example, each NW slice may include only the UPF 50. That is, only a process related to the U-plane may be divided by the NW slice. In this case, each function implemented in the CPF 40 is implemented in the common CPF 30.

<Operation Overview>

When an application related to a specific service starts communication, the user equipment UE transmits an access request signal including information for specifying the NW slice providing the specific service (hereinafter referred to as "NW slice specifying information") among the plurality of NW slices accessed to the APN to the APN of a communication destination and the common CPF 30. The common CPF 30 selects the NW slice based on the "NW slice specifying information" included in the received access request signal. The CPF 40 and the UPF 50 in the NW slice selected by the common CPF 30 establishes a communication path of the U-plane in which the request conditions of the specific service are satisfied between the user equipment UE and the APN.

In the radio communication system according to the embodiment, information indicating association of the NW slice specifying information with the APN (hereinafter referred to as "access information") is transmitted to the user equipment UE in an attachment or location update procedure. The user equipment UE determines the NW slice specifying information and the APN included in an access request signal transmitted to the common CPF 30 based on the access information when the application starts communication.

<Functional Configuration>

Next, functional configuration examples of the user equipment UE, the HSS 20, the common CPF 30, the CPF 40, and the UPF 50 performing operations according to each embodiment are described.

(User Equipment)

Figure 2:
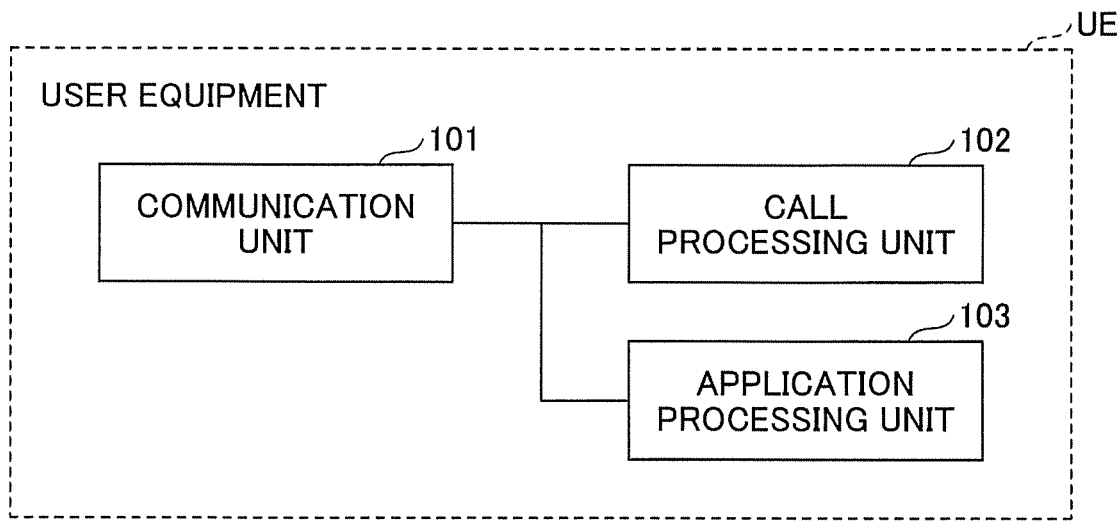
FIG. 2 is a diagram illustrating a functional configuration example of user equipment according to each embodiment.

FIG. 2 is a diagram illustrating a functional configuration example of user equipment according to each embodiment. As illustrated in FIG. 2, the user equipment UE includes a communication unit 101, a call processing unit 102, and an application processing unit 103. FIG. 2 illustrates only functional units particularly related to the embodiment of the invention in the user equipment UE. The functional configuration illustrated in FIG. 2 is merely an example. Any functional division and any name of the functional unit may be used as long as an operation according to the embodiment can be executed.

The communication unit 101 performs various types of communication with the RAN 10, the common CPF 30, the CPF 40, and the UPF 50.

The call processing unit 102 has a function of processing a call control signal (C-plane signal) transmitted and received via the communication unit 101. When an application installed in the user equipment UE performs communication with a specific APN, the call processing unit 102 transmits NW slice specifying information for specifying any one NW slice among the plurality of NW slices accessed to the specific APN and an access request signal including the APN indicating a communication destination of user data to the common CPF 30.

The call processing unit 102 may receive access information from the common CPF 30 and determine the NW slice specifying information included in an access request and the APN indicating a communication destination of the user data based on the received access information.

The application processing unit 103 performs an application installed in the user equipment UE. When the application processing unit 103 performs the application, the application processing unit 103 may notify the call processing unit 102 of information regarding a service requested by the application (for example, information indicating that a mobile broadband service is requested).

(HSS)

Figure 3:
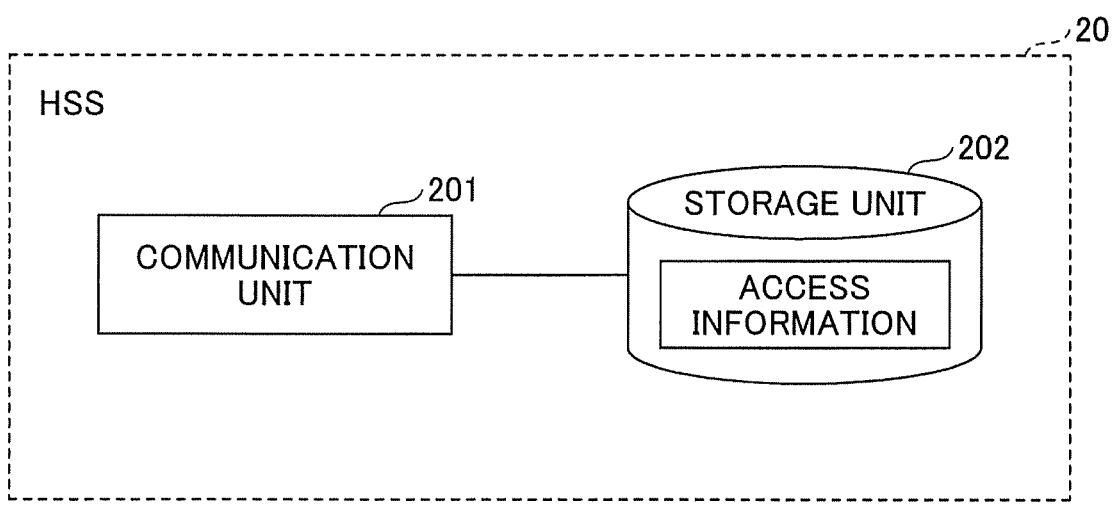
FIG. 3 is a diagram illustrating a configuration example of an HSS function according to each embodiment.

FIG. 3 is a diagram illustrating a configuration example of an HSS function according to each embodiment. As illustrated in FIG. 3, the HSS 20 includes a communication unit 201 and a storage unit 202. FIG. 3 illustrates only functional units particularly to the embodiment of the invention in the HSS 20. The functional configuration illustrated in FIG. 3 is merely an example. Any functional division and any name of the functional unit may be used as long as an operation according to the embodiment can be executed.

The communication unit 201 performs various types of communication with the common CPF 30, the common CPF (default) $30_{Def}$, and the CPF 40.

The storage unit 202 stores "access information." The "access information" stored in the storage unit 202 is described below.

(Common CPF)

Figure 4:
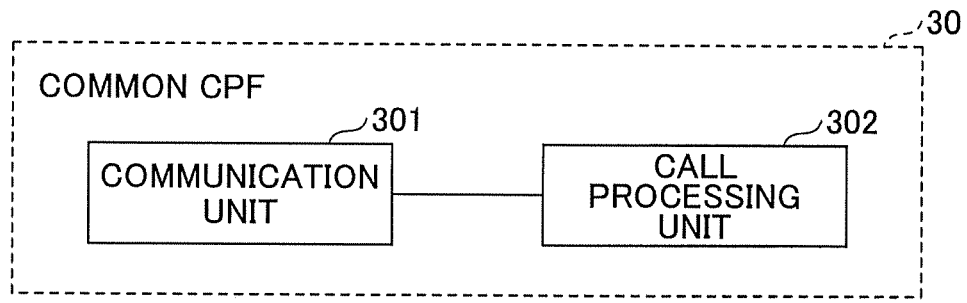
FIG. 4 is a diagram illustrating a configuration example of a common CPF function according to each embodiment.

FIG. 4 is a diagram illustrating a configuration example of the common CPF function according to each embodiment. As illustrated in FIG. 4, the common CPF 30 (including the common CPF (default) $30_{Def}$) includes a communication unit 301 and a call processing unit 302. FIG. 4 illustrates only functional units particularly related to the embodiment of the invention in the common CPF 30. The functional configuration illustrated in FIG. 4 is merely an example. Any functional division and any name of the functional unit may be used as long as an operation according to the embodiment can be executed.

The communication unit 301 performs various types of communication with the RAN 10, the HSS 20, and the CPF 40.

The call processing unit 302 has a function of processing a call control signal (C-plane signal) transmitted and received via the communication unit 301. The call processing unit 302 includes a mobility management function, an authentication and authorization function, and an NW slice selection function. When the common CPF 30 operates as the common CPF (default) $30_{Def}$, the call processing unit 302 has a function of redirecting the call control signal received from the RAN 10 to the appropriate common CPF 30.

When an access request signal is received from the user equipment UE, the call processing unit 302 transmits an access request signal including the APN to the CPF 40 belonging to the NW slice specified with the NW slice specifying information included in the access request signal.

As described above, when each function implemented in the CPF 40 is implemented in the common CPF 30 and an access request signal is received from the user equipment UE, the call processing unit 302 transmits an access request signal including the APN to the UPF 50 belonging to one NW slice specified with the NW slice specifying information among the plurality of UPFs 50 accessed to a communication destination indicated by the APN included in the access request signal.

When an attach request signal or a location update request signal is received from the user equipment UE, the call processing unit 402 may obtain the access information from the HSS 20 and may transmit the obtained access information to the user equipment UE.

(CPF)

Figure 5:
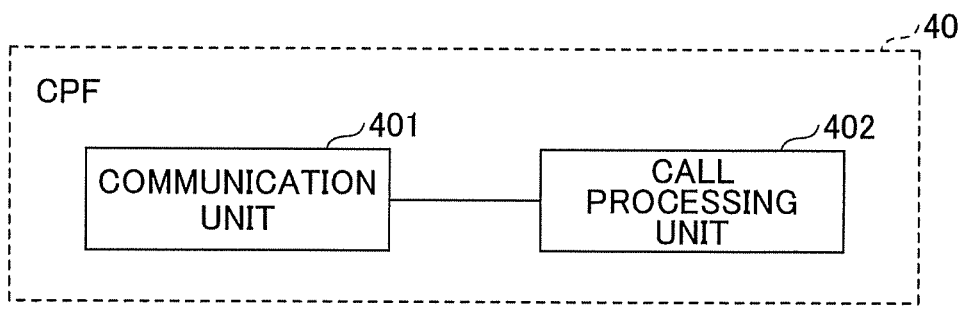
FIG. 5 is a diagram illustrating a configuration example of a CPF function according to each embodiment.

FIG. 5 is a diagram illustrating a configuration example of a CPF function according to each embodiment. As illustrated in FIG. 5, the CPF 40 includes a communication unit 401 and a call processing unit 402. FIG. 5 illustrates only functional units particularly related to the embodiment of the invention in the CPF 40. The functional configuration illustrated in FIG. 5 is merely an example. Any functional division and any name of the functional unit may be used as long as an operation according to the embodiment can be executed.

The communication unit 401 performs various types of communication with the HSS 20, the common CPF 30, and the UPF 50.

The call processing unit 402 has a function of processing a call control signal (C-plane signal) transmitted and received via the communication unit 401. When an access request signal is received from the common CPF 30, the call processing unit 402 transmits the access request signal including the APN to the UPF 50 belonging to the self-NW slice.

(UPF)

Figure 6:
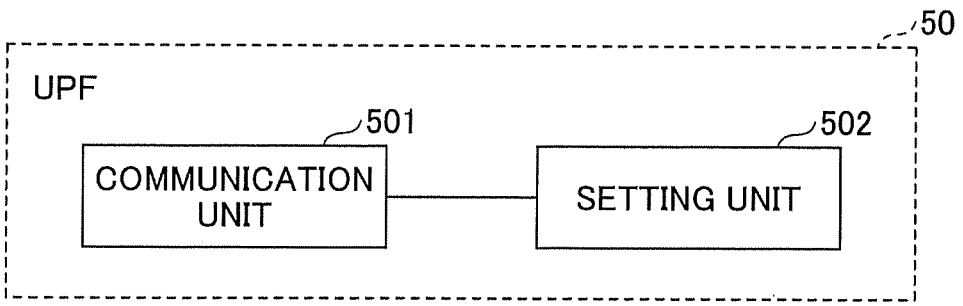
FIG. 6 is a diagram illustrating a configuration example of a UPF function according to each embodiment.

FIG. 6 is a diagram illustrating a configuration example of a UPF function according to each embodiment. As illustrated in FIG. 6, the UPF 50 includes a communication unit 501 and a setting unit 502. FIG. 6 illustrates only functional units particularly related to an embodiment of the invention in the UPF 50. The functional configuration illustrated in FIG. 6 is merely an example. Any functional division and any name of the functional unit may be used as long as an operation according to the embodiment can be executed.

The communication unit 501 performs various types of communication with the RAN 10, the CPF 40, and the AS 60.

The setting unit 502 has a function of configuring a communication path of user data (U-plane) between a communication destination indicated by the APN included in an access request signal and the user equipment UE when the access request signal is received from the CPF 40.

<Hardware Configuration>

As described above, the block diagrams (FIGS. 2 to 6) used to describe the functional configurations illustrate blocks of functional units. The functional blocks (constituent elements) are implemented by any combination of hardware and/or software. In addition, means for implementing each functional block is not particularly limited. That is, each functional block may be implemented by one apparatus in which the functional blocks are combined physically and/or logically or may be implemented by two or more apparatuses that are physically and/or logically separated by accessing the plurality of apparatuses directly and/or indirectly (for example, in a wired and/or wireless manner).

Figures 7, 8:
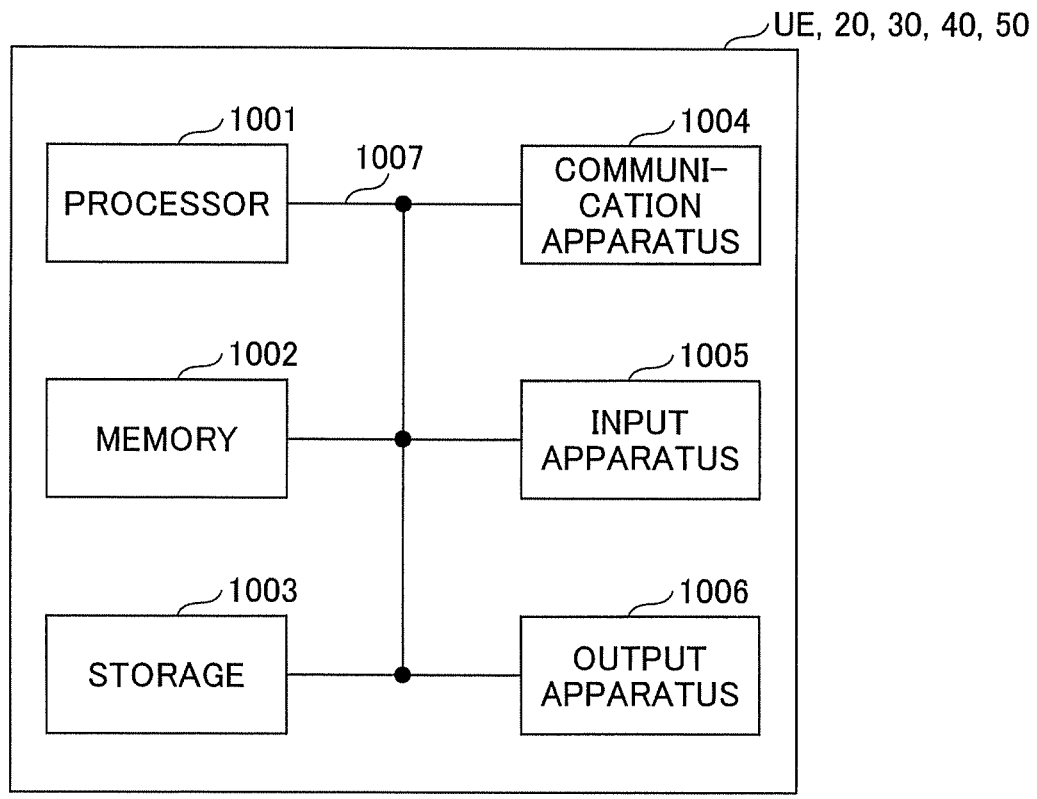
FIG. 7 is a diagram illustrating a hardware configuration example of the user equipment, the HSS, the common CPF, the CPF, and the UPF according to each embodiment.
FIG. 8 is a diagram illustrating an example of access information stored in the HSS according to a first embodiment.

For example, the user equipment UE, the HSS 20, the common CPF 30, the CPF 40, and the UPF 50 according to each embodiment may function as a computer that performing a process for a communication method according to the invention. FIG. 7 is a diagram illustrating a hardware configuration example of the user equipment UE, the HSS 20, the common CPF 30, the CPF 40, and the UPF 50 according to each embodiment. The above-described user equipment UE, HSS 20, common CPF 30, CPF 40, and UPF 50 may be physically configured as a computer apparatus that includes a processor 1001, a memory 1002, a storage 1003, a communication apparatus 1004, an input apparatus 1005, an output apparatus 1006, and a bus 107.

In the following description, a term "apparatus" can be replaced with a circuit, a device, a unit, or the like. The hardware configuration of the user equipment UE, the HSS 20, the common CPF 30, the CPF 40, and the UPF 50 may be configured to one apparatus or a plurality of apparatuses illustrated in the drawing or may be configured not to include some of the apparatuses.

The functions of the user equipment UE, the HSS 20, the common CPF 30, the CPF 40, and the UPF 50 are implemented by reading predetermined software (program) on hardware such as the processor 1001 or the memory 1002 so that the processor 1001 can perform an arithmetic operation and controlling communication by the communication apparatus 1004 and reading and/or writing of data in the memory 1002 and the storage 1003.

For example, the processor 1001 controls the entire computer by operating an operating system. The processor 1001 may also be configured as a central processing unit (CPU) that includes an interface with a peripheral apparatus, a control apparatus, an arithmetic apparatus, and a register. For example, the communication unit 101, the call processing unit 102, and the application processing unit 103 of the user equipment UE, the communication unit 201 and the storage unit 202 of the HSS 20, the communication unit 301 and the call processing unit 302 of the common CPF 30, the communication unit 401 and the call processing unit 402 of the CPF 40, and the communication unit 501 and the setting unit 502 of the UPF 50 may be implemented by the processor 1001.

The processor 1001 reads a program (program codes), a software module, or data from the storage 1003 and/or the communication apparatus 1004 to the memory 1002 and performs various processes according to the program, the software module, or the data. As the program, a program causing a computer to perform at least some of the operations described in each embodiment is used. For example, the communication unit 101, the call processing unit 102, and the application processing unit 103 of the user equipment UE, the communication unit 201 and the storage unit 202 of the HSS 20, the communication unit 301 and the call processing unit 302 of the common CPF 30, the communication unit 401 and the call processing unit 402 of the CPF 40, and the communication unit 501 and the setting unit 502 of the UPF 50 may be implemented by a control program that is stored in the memory 1002 and is operated by the processor 1001 or may be implemented similarly in another functional block. It is described that each of the above-described processes is executed by one processor 1001; however, the above-described processes may be simultaneously or sequentially executed by two or more processors 1001. The processor 1001 may be implemented by one or more chips. The program may be transmitted from a network via an electric communication circuit.

The memory 1002 is a computer-readable recording medium and may be configured by at least one of, for example, a read-only memory (ROM), an erasable programmable ROM (EPROM), an electrically erasable programmable ROM (EEPROM), and a random access memory (RAM). The memory 1002 may also be referred to as a register, a cache, a main memory (main storage apparatus), or the like. The memory 1002 can store a program (program codes), a software module, or the like which can be executed to perform a communication method according to each embodiment.

The storage 1003 is a computer-readable recording medium and may be configured by at least one of, for example, an optical disc such as a compact disc ROM (CD-ROM), a hard disk drive, a flexible disc, a magneto-optical disc (for example, a compact disc, a digital versatile disk, a Blu-ray (registered trademark) disc), a smart card, a flash memory (for example, a card, a stick, or a key drive), a floppy (registered trademark) disk, and a magnetic script. The storage 1003 may also be referred to as an auxiliary storage apparatus. The above-described storage medium may be, for example, a database or a server including the memory 1002 and/or the storage 1003 or another appropriate medium.

The communication apparatus 1004 is hardware (a transmission and reception device) that performs communication between computers via a wired and/or wireless network and is also referred to as, for example, a network device, a network controller, a network card, or a communication module. For example, the communication unit 101 of the user equipment UE, the communication unit 201 of the HSS 20, the communication unit 301 of the common CPF 30, the communication unit 401 of the CPF 40, and the communication unit 501 of the UPF 50 may be implemented by the communication apparatus 1004.

The input apparatus 1005 is an input device (for example, a keyboard, a mouse, a microphone, a switch, a button, or a sensor) that receives an input from the outside. The output apparatus 1006 is an output device (for example, a display, a speaker, or an LED lamp) that performs an output to the outside. The input apparatus 1005 and the output apparatus 1006 may be configured to be integrated (for example, a touch panel).

The apparatuses such as the processor 1001 and the memory 1002 are accessed to the bus 1007 for communicating information. The bus 1007 may be configured as a single bus or may be configured by different buses between the apparatuses.

The user equipment UE, the HSS 20, the common CPF 30, the CPF 40, and the UPF 50 may be configured to include hardware components such as a microprocessor, a digital signal processor (DSP), an application specific integrated circuit (ASIC), a programmable logic device (PLD), or a field programmable gate array (FPGA), or some or all of the functional blocks may be implemented by the hardware components. For example, the processor 1001 may be implemented by at least one of the hardware components.

<Processing Procedure>

Next, specific processing procedures performed by the radio communication system according to the embodiment are described separately in first and second embodiments.

First Embodiment

In the first embodiment, an identifier for identifying a service provided with an NW slice (hereinafter referred to as a "service identifier") is used as the NW slice specifying information. The service identifier may also be referred to as a service parameter. The service identifier is, for example, an ID indicating a mobile broadband service or an ID indicating a critical communication service.

FIG. 8 is a diagram illustrating an example of access information stored in the HSS according to the first embodiment. As illustrated in FIG. 8, in the access information stored in the HSS, a "UE type" indicating a type of user equipment UE, a "dedicated core network-ID (DCN-ID)" uniquely identifying the common CPF 30, a "service identifier," and "APN" are associated with each other. Here, in the first embodiment, it is assumed that different common CPF $30_1$ to $_N$ are associated for each type of user equipment UE. That is, when the type of user equipment UE is different, the common CPF $30_1$ to $_N$ performing call control are also different. However, when the type of user equipment UE is the same, the common CPF $30_1$ to $_N$ performing the call control is also the same. Accordingly, as illustrated in FIG. 8, the same "DCN-ID" is set in the same "UE type."

(Reporting of Access Information to User Equipment UE)

Figure 9:
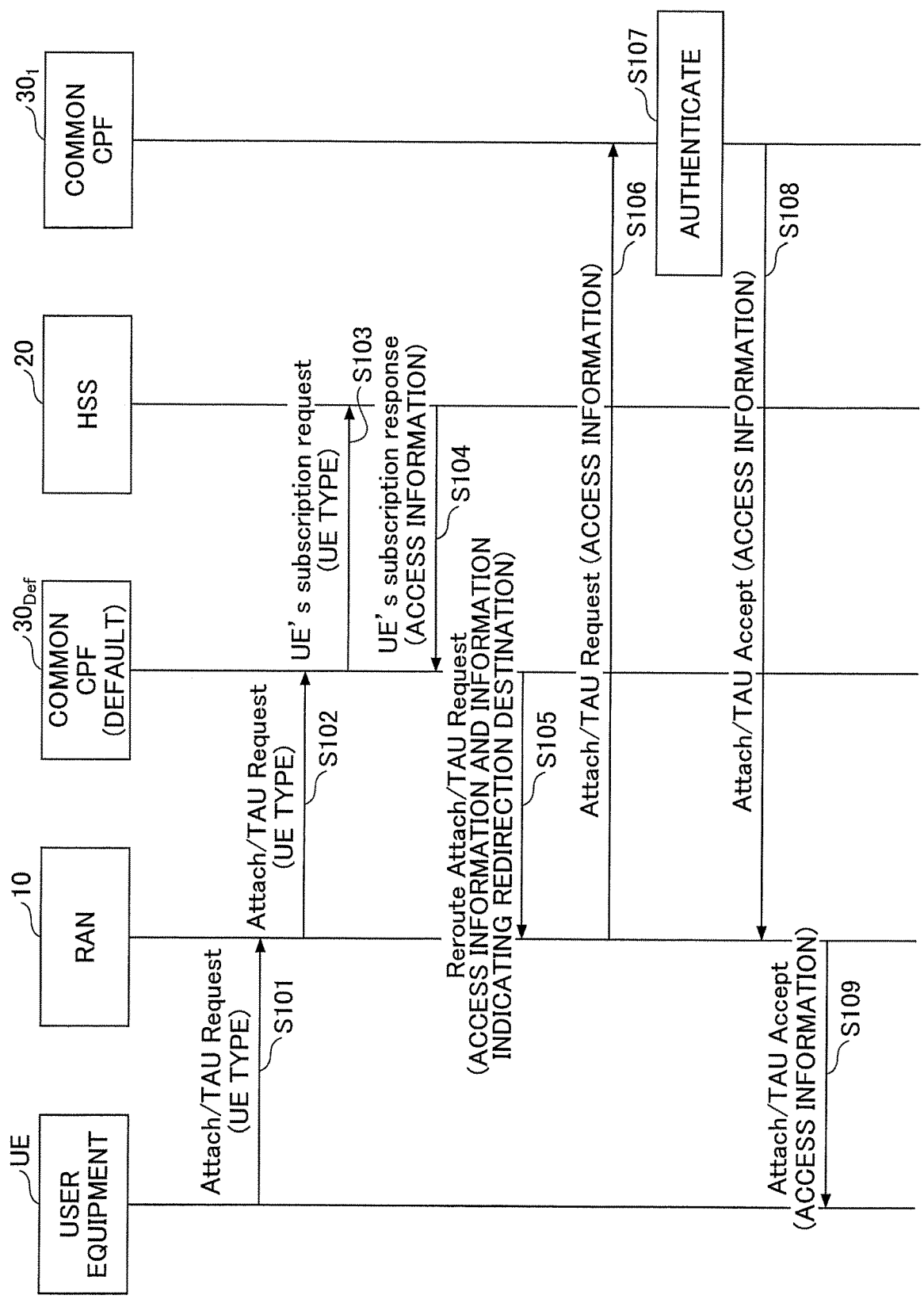
FIG. 9 is a sequence diagram illustrating an example of a notification procedure of the access information according to the first embodiment.

FIG. 9 is a sequence diagram illustrating an example of a notification procedure of the access information according to the first embodiment. First, the call processing unit 102 of the user equipment UE transmits an attach request or a tracking area update (TAU) request including the "UE type" indicating the type of user equipment UE to the RAN 10 (S101). The RAN 10 transmits the attach request or the TAU request received from the user equipment UE to the common CPF (default) $30_{Def}$ (S102). The call processing unit 302 of the common CPF (default) $30_{Def}$ transmits a UE's subscription request including the "UE type" to the HSS 20 (S103). The communication unit 201 of the HSS 20 generates "access information" to be reported to the user equipment UE by retrieving the "access information" using the "UE type" as a key and transmits a UE's subscription response including the generated access information to the common CPF (default) $30_{Def}$ (S104). An example of the access information generated when the UE type is "#1" is illustrated in FIG. 11.

The call processing unit 302 of the common CPF (default) $30_{Def}$ transmits a reroute attach request or a reroute TAU request including the access information and information indicating the common CPF 30 of a redirection destination to the RAN 10 in order to redirect the attach request or the TAU request to the common CPF 30 corresponding to the UE type (S105). The RAN 10 transmits the attach request or the TAU request including the access information to the common CPF 30 (S106).

Subsequently, the call processing unit 302 of the common CPF 30 performs an authentication process of the user equipment UE based on the received attach request or TAU request (S107). When the authentication process is completed, the call processing unit 302 of the common CPF 30 transmits an attach accept or a TAU accept including the access information to the RAN 10 (S108). The RAN 10 transmits the attach accept or the TAU accept including the access information to the user equipment UE (S109).

In accordance with the above-described processing procedure, the access information including the DCN-ID, the service identifier, and the APN can be reported to (configured in) the user equipment UE.

In a next generation system, unlike LTE, the UPF 50 may be changed when the location of the user equipment UE is updated. By including a case in which the location of the user equipment UE is updated in the processing procedure of FIG. 8, the changed access information can be reported to (configured in) the user equipment UE when the access information is changed due to the change of the UPF 50.

In the above-described processing procedure, information indicating the common CPF 30 corresponding to the UE type may be stored in advance on the side of the RAN 10 and the redirecting process (S105 and S106) may be omitted. Specifically, the RAN 10 may transmit the attach request or the TAU request to the common CPF 30 corresponding to the UE type (S102), the common CPF 30 may transmit the UE's subscription request including the "UE type" to the HSS 20 (S103), and the communication unit 201 of the HSS 20 may transmit the UE's subscription response including the generated access information to the common CPF (S104). Thus, the common CPF (default) $30_{Def}$ is not necessary and the redirecting process (S105 and S106) is omitted, and thus the processing procedure related to the attachment or the position updating can be simplified.

(Communication Starting Process)

Figure 10:
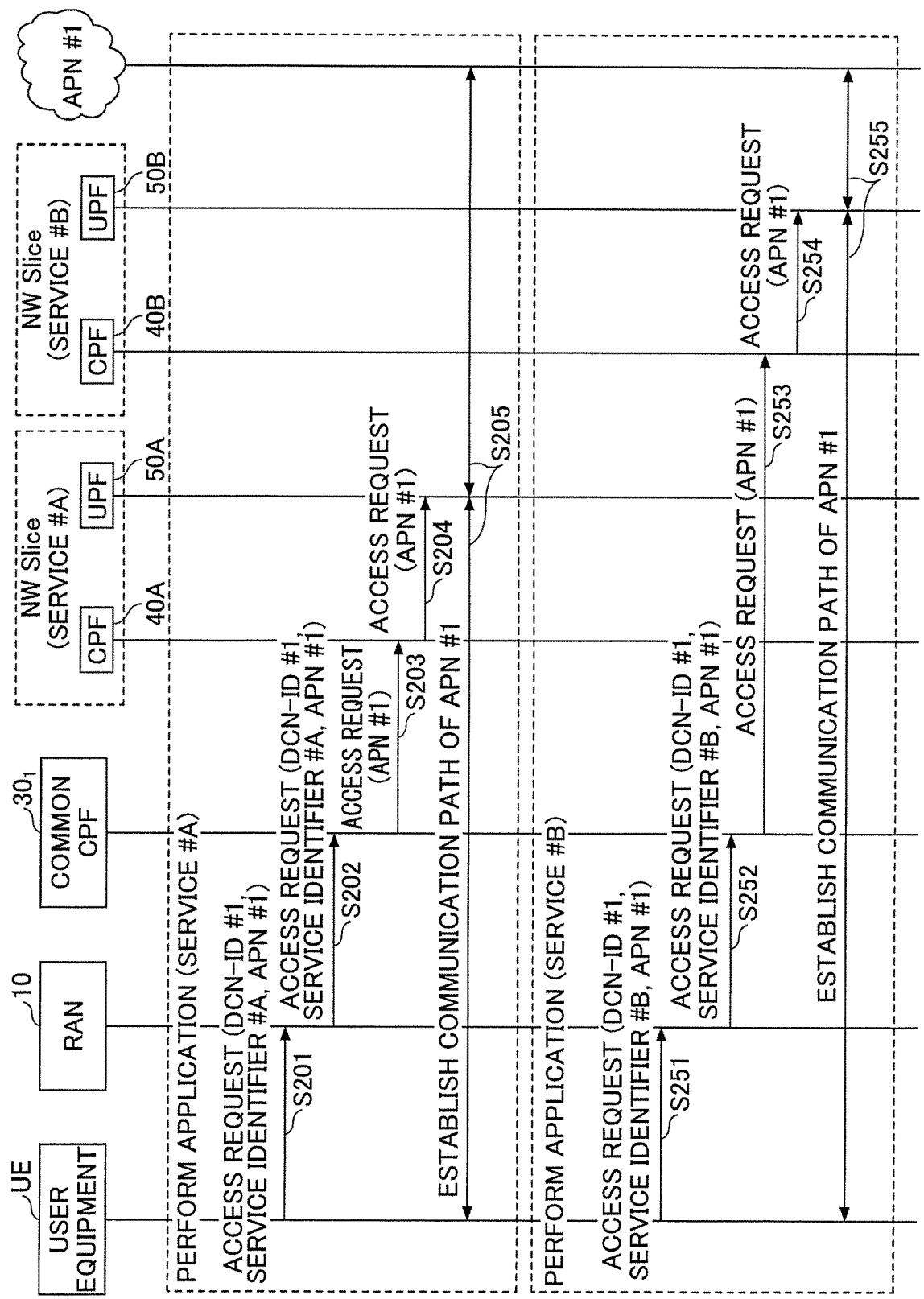
FIG. 10 is a sequence diagram illustrating an example of a communication starting process according to the first embodiment.

FIG. 10 is a sequence diagram illustrating an example of a communication starting process according to the first embodiment. In the example of FIG. 10, it is assumed that the type of user equipment UE is UE type #1; that the access information (FIG. 11) corresponding to the UE type "#1" is extracted as the access information to be reported to the user equipment UE from the access information (FIG. 8) stored in the HSS 20; and that the extracted access information is reported to the user equipment UE.

In the example of FIG. 10, both of access destination APNs of the application related to service #A and the application related to service #B are assumed to be APN #1. The common CPF 30 corresponding to DCN-ID #1 is assumed to be the common CPF $30_1$. The call processing unit 102 of the user equipment UE is assumed to be aware of the service identifier of a service requested by an application performed by the user equipment UE through notification or the like from the application processing unit 103.

First, a processing procedure when the user equipment UE performs the application related to service #A is described.

The call processing unit 102 of the user equipment UE determines DCN-ID #1 included in the access request, service identifier #A, and APN #1 which is the access destination APN based on the access information. For example, the call processing unit 102 determines DCN-ID included in the access information as DCN-ID included in the access request.

The call processing unit 102 determines the service identifier of the service requested by the application executed by the call control unit 102 and the access destination APN as the service identifier and the APN to be included in the access request. The call processing unit 102 may confirm whether the service identifier of the service requested by the application executed by the call processing unit 102 and the APN exist in the access information and may transmit an access request when the service identifier and the APN exist. For example, the call processing unit 102 may confirm whether there is service identifier #A corresponding to service #A in a record corresponding to APN #1 in the access information illustrated in FIG. 11 and may transmit an access request when there is service identifier #A corresponding to service #A. Thus, it is possible to prevent the user equipment UE from including the APN and the service identifier not supported on a network side in an access request and transmitting the access request.

Subsequently, the call processing unit 102 transmits an access request including the determined DCN-ID #1, service identifier #A, and APN #1 to the RAN 10 (S201).

Subsequently, the RAN 10 determines the common CPF 30 transmitting the access request based on DCN-ID included in the access request. In the example of FIG. 10, the RAN 10 transmits an access request including service identifier #A and APN #1 to the common CPF $30_1$ corresponding to DCN-ID #1 included in the access request (S202).

Subsequently, the call processing unit 302 of the common CPF $30_1$ transmits an access request including APN #1 to the CPF $40_A$ belonging to the NW slice (service #A) specified by service identifier #A received in step S202 (S203). Subsequently, the call processing unit 402 of the common CPF $40_A$ transmits the access request including APN #1 to the UPF $50_A$ in the NW slice (service #A) (S204).

Subsequently, the setting unit 502 of the UPF $50_A$ establishes a communication path of the user data (U-plane) between APN #1 and the user equipment UE (S205). The communication path of the user data may also be referred to as packet data unit (PDU) connection.

Next, a processing procedure when the user equipment UE performs the application of service #B is described.

The call processing unit 102 of the user equipment UE determines service identifier #B, APN #1 which is the access destination APN, and DCN-ID #1 included in the access request, based on the access information. Subsequently, the call processing unit 102 of the user equipment UE transmits an access request including the determined DCN-ID #1, service identifier #B, and APN #1 to the RAN 10 (S251).

Subsequently, the RAN 10 transmits an access request including service identifier #B and APN #1 to the common CPF $30_1$ corresponding to DCN-ID #1 included in the access request (S252).

Subsequently, the call processing unit 302 of the common CPF $30_1$ transmits an access request including APN #1 to the CPF $40_B$ belonging to the NW slice (service #B) specified by service identifier #B received in step S252 (S253). Subsequently, the call processing unit 402 of the common CPF $40_B$ transmits the access request including APN #1 to the UPF $50_B$ in the NW slice (service #B) (S254).

Subsequently, the setting unit 502 of the UPF $50_B$ establishes a communication path of the user data (U-plane) between APN #1 and the user equipment UE (S255).

In step S201 or S251 of the above-described processing procedure, the user equipment UE may not include APN in the access request. In this case, the CPF 40 recognizes an access destination APN as a default APN. The CPF 40 may query the HSS 20 for the default APN.

In the above-described processing procedure, when only the process related to the U-plane is divided in accordance with the NW slice (that is, when each function implemented in the CPF 40 is implemented in the common CPF 30), the call processing unit 302 of the common CPF 30 directly transmits the access request including APN #1 to the UPF $50_A$ in the NW slice (service #A) in step S203. Similarly, in step S253, the call processing unit 302 of the common CPF 30 directly transmits the access request including APN #2 to the UPF $50_B$ in the NW slice (service #B).

Modified Example of First Embodiment

In the first embodiment, the type of user equipment UE may be identified with "DCN-ID." That is, DCN-ID may be an ID for uniquely identifying the common CPF 30 and is an ID implying the type of user equipment UE. In addition, originally, the type of user equipment UE may not be considered. That is, the user equipment UE may associate the type of user equipment with DCN-ID based on any attribute.

In this case, the "UE type" is not included in the access information illustrated in FIG. 8, and "DCN-ID," the "service identifier," and "APN" are associated with each other to be stored.

In FIG. 9, the call processing unit 102 of the user equipment UE transmits an attach request or a tracking area update (TAU) request including "DCN-ID" allocated to the user equipment UE to the RAN 10 (S101). The RAN 10 transmits the attach request or the TAU request received from the user equipment UE to the common CPF (default) $30_{Def}$ (S102). The call processing unit 302 of the common CPF (default) $30_{Def}$ transmits a UE's subscription request including "DCN-ID" to the HSS 20 (S103). The communication unit 201 of the HSS 20 generates "access information" of which the user equipment UE is to be notified by retrieving the "access information" by setting the "DCN-ID" as a key and transmits a UE's subscription response including the generated access information to the common CPF (default) $30_{Def}$ (S104).

The first embodiment is described above. In the study of 3GPP up to the present, it is assumed that a NW slice is selected using APN. Accordingly, it is not assumed that a plurality of NW slices are configured for originally the same APN. However, in future, it is expected that a system may be required such that a plurality of NW Slices are configured for the same APN, and a NW Slice for establishing a communication path is switched depending on a service.

Specifically, it is expected that a system may be required such that, when an application related to a service #A is executed in user equipment, a process required for establishing a communication path to the APN #1 is allowed to be executed by a CPF and a UPF within a NW Slice (service #A), and when an application related to a service #B is executed in the user equipment, a process required for establishing a communication path to the APN #1 is allowed to be executed by a CPF and a UPF within a NW Slice (service #B). According to the first embodiment, a NW slice is appropriately selected, even if a plurality of NW slices are configured for the same APN.

Second Embodiment

In a second embodiment, "DCN-ID" for uniquely identifying the common CPF 30 is used as NW slice specifying information.

FIG. 12 is a diagram illustrating an example of access information according to the second embodiment. As illustrated in FIG. 12, "UE type" indicating the type of user equipment UE, "DCN-ID," and "APN" are associated with access information according to the second embodiment. In the second embodiment, by using "DCN-ID" as NW slice specifying information, a plurality of "DCN-IDs" are associated with one common CPF 30. In the second embodiment, DCN-ID #1 and DCN-ID #2 are assumed to be associated with the common CPF $30_1$.

(Reporting of Access Information)

Figure 13:
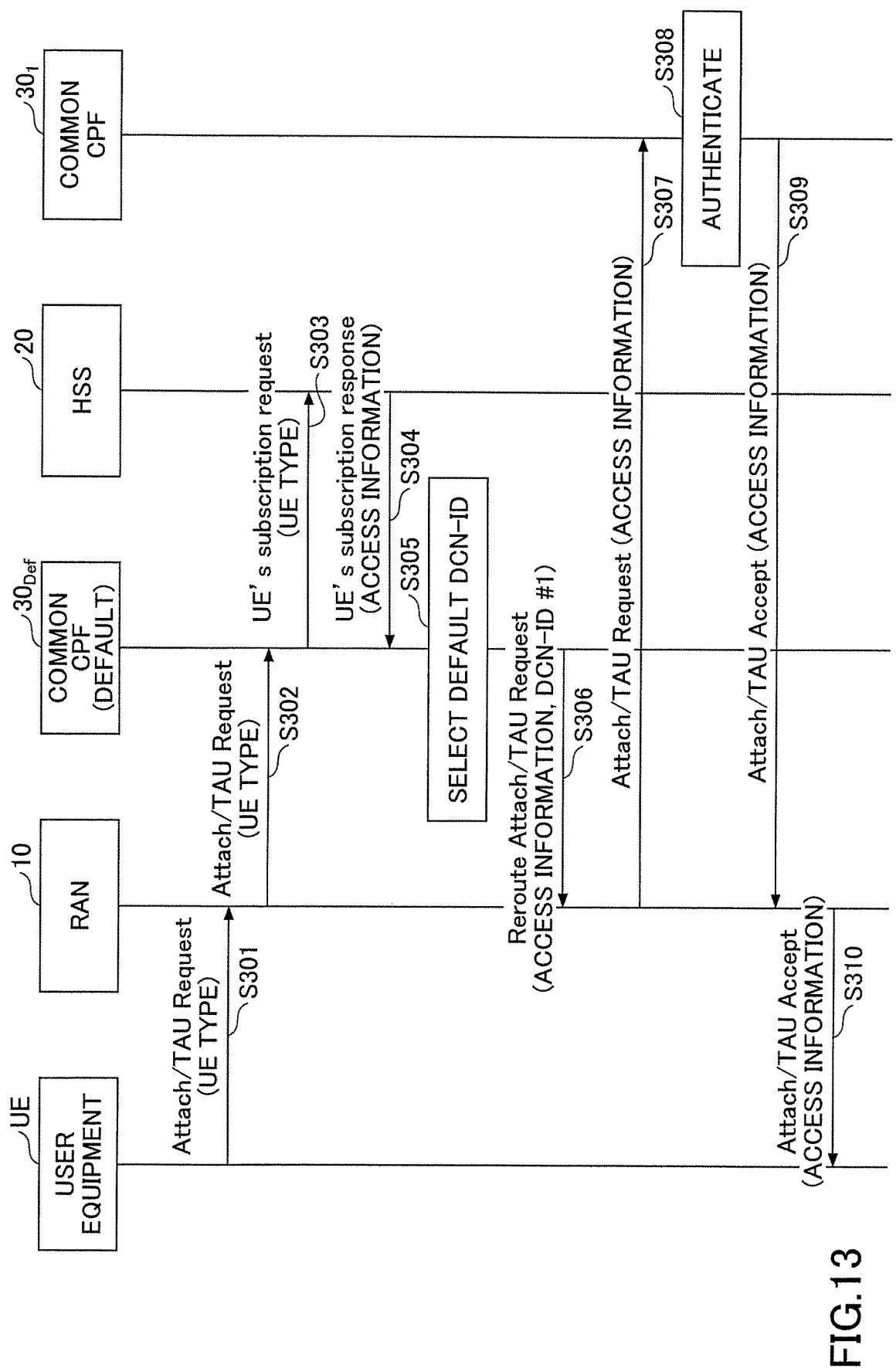
FIG. 13 is a sequence diagram illustrating an example of an access information notification procedure according to the second embodiment.
Figure 14:
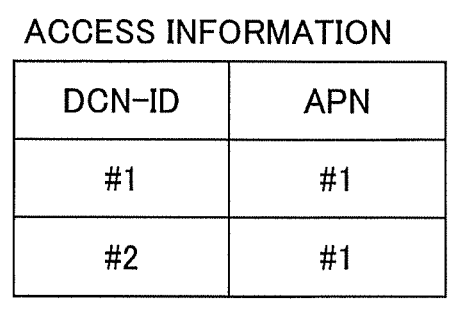

FIG. 13 is a sequence diagram illustrating an example of an access information notification procedure according to the second embodiment. First, the call processing unit 102 of the user equipment UE transmits an attach request or a tracking area update (TAU) request including the "UE type" indicating the type of user equipment UE to the RAN 10 (S301). The RAN 10 transmits the attach request or the TAU request received from the user equipment UE to the common CPF (default) $30_{Def}$ (S302). The call processing unit 302 of the common CPF (default) $30_{Def}$ transmits a UE's subscription request including the "UE type" to the HSS 20 (S303). The communication unit 201 of the HSS 20 generates "access information" to be reported to the user equipment UE by retrieving the "access information" using the "UE type" as a key and transmits a UE's subscription response including the generated access information to the common CPF (default) $30_{Def}$ (S304). An example of the access information generated when the UE type is "#1" is illustrated in FIG. 14.

Here, in the second embodiment, the plurality of DCN-IDs are associated with the same common CPF 30. Accordingly, an ID used to identify the common CPF 30 in the radio communication system among the plurality of DCN-IDs allocated to the same common CPF 30 is defined as a default DCN-ID.

The call processing unit 302 of the common CPF (default) $30_{Def}$ selects the default DCN-ID, which is for redirecting the Attach Request or the TAU Request, to be reported to the RAN 10 (S305). The default DCN-ID may be determined in advance among the plurality of DCN-IDs or may be determined based on a predetermined condition (for example, the earliest DCN-ID). Here, DCN-ID #1 is assumed to be selected as the default DCN-ID.

Subsequently, the call processing unit 302 of the common CPF (default) $30_{Def}$ transmits a reroute attach request or a reroute TAU request including the access information and DCN-ID #1 in order to redirect the attach request or the TAU request to the RAN 10 (S306). The RAN 10 transmits the attach request or the TAU request including the access information to the common CPF 30 (S307).

Subsequently, the call processing unit 302 of the common CPF 30 performs an authentication process of the user equipment UE based on the received attach request or TAU request (S308). When the authentication process is completed, the call processing unit 302 of the common CPF 30 transmits an attach accept or a TAU accept including the access information to the RAN 10 (S309). The RAN 10 transmits the attach accept or the TAU accept including the access information to the user equipment UE (S310).

In accordance with the above-described processing procedure, the access information including the DCN-ID and the APN can be reported to (set in) the user equipment UE.

In a next generation system, unlike LTE, during location update of the user equipment UE, the UPF 50 may be changed. By including a case in which the location of the user equipment UE is updated in the processing procedure of FIG. 13, the changed access information can be reported to (configured in) the user equipment UE when the access information is changed due to the change of the UPF 50.

In the above-described processing procedure, the redirecting process (S105 and S106) may be omitted. Specifically, the RAN 10 may transmit the attach request or the TAU request to the common CPF 30 (or the common CPF 30 set at random or in advance) corresponding to the UE type (S302), the common CPF 30 may transmit the UE's subscription request including the "UE type" to the HSS 20 (S303), and the communication unit 201 of the HSS 20 may transmit the UE's subscription response including the generated access information to the common CPF 30 (S304). Thus, the common CPF (default) $30_{Def}$ is not necessary and the redirecting process (S306 and S307) is omitted, and thus the processing procedure related to the attachment or the location updating can be simplified.

(Communication Starting Process)

Figure 15:
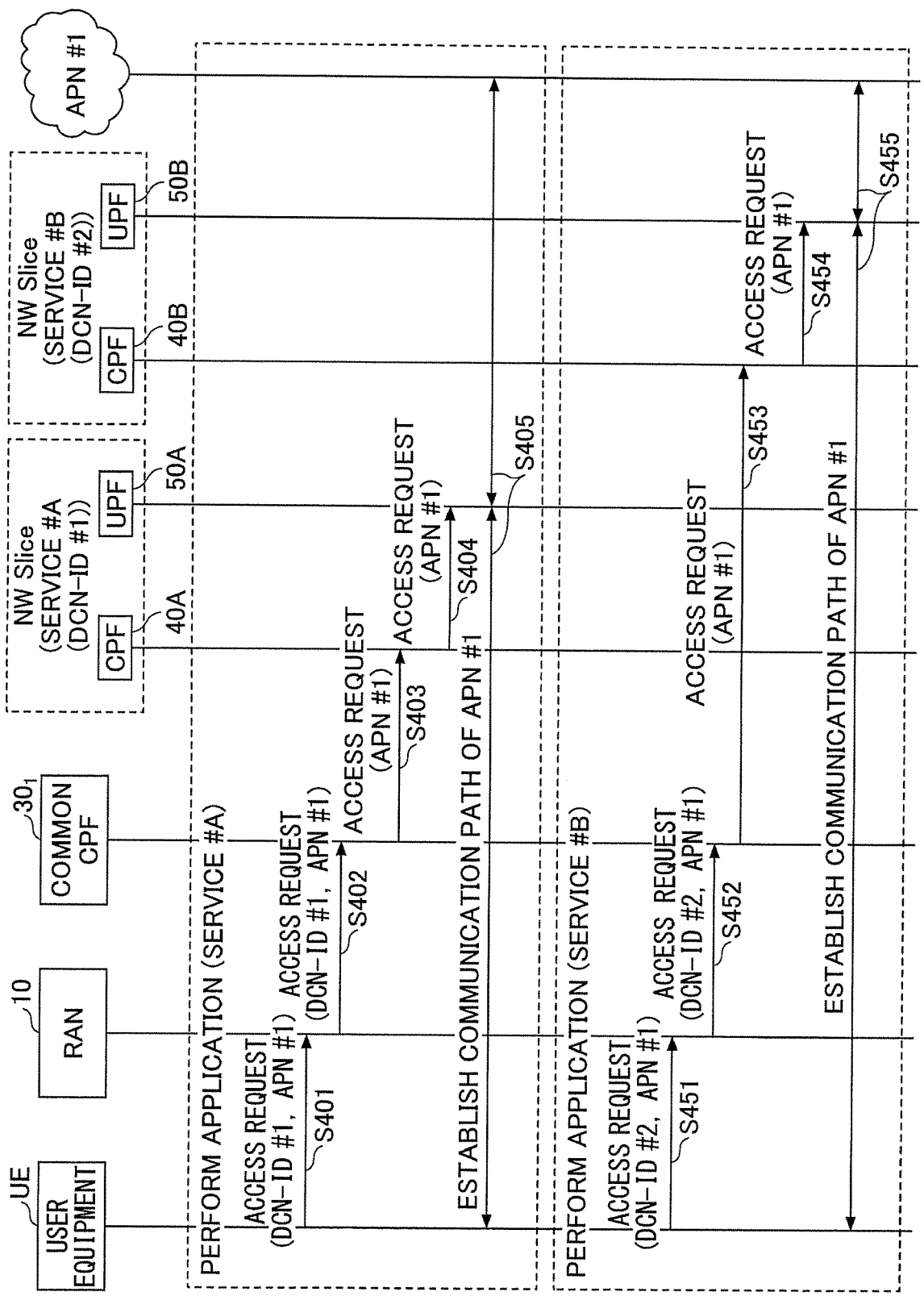
FIG. 15 is a sequence diagram illustrating an example of a communication starting process according to the second embodiment.

FIG. 15 is a sequence diagram illustrating an example of a communication starting process according to the second embodiment. In the example of FIG. 15, it is assumed that the type of user equipment UE is UE type #1, access information (FIG. 14) corresponding to the UE type "#1" is extracted as the access information in the access information of FIG. 12, and the extracted access information is transmitted to the user equipment UE.

In the example of FIG. 15, both of access destination APNs of the application related to service #A and the application related to service #B are assumed to be APN #1.

The call processing unit 102 of the user equipment UE is assumed to be aware of the DCN-ID of a service requested by an application performed by the user equipment UE through notification or the like from the application processing unit 103. In the example of FIG. 15, it is assumed that DCN-ID #1 is associated with service #A (that is, the NW slice (service #A)) and DCN-ID #2 is associated with service #B (that is, the NW slice (service #B)).

First, a processing procedure when the user equipment UE performs the application related to service #A is described.

The call processing unit 102 of the user equipment UE determines DCN-ID #1 included in the access request and APN #1 which is the access destination APN based on the access information. For example, the call processing unit 102 may confirm whether there are the APN and DCN-ID of the service requested by the application performed by the user equipment UE in the access information and may transmit an access request when there are the APN and DCN-ID. For example, the call processing unit 102 may confirm whether there is DCN-ID #1 corresponding to service #A in a record corresponding to APN #1 in the access information illustrated in FIG. 14 and may transmit an access request when there is DCN-ID #1 corresponding to service #A. Thus, it is possible to prevent the user equipment UE from including the APN and DCN-ID not supported on a network side in an access request and transmitting the access request.

In the second embodiment, the access information of which the user equipment UE is notified may include the service identifier and DCN-ID in association therewith and the call processing unit 102 may determine DCN-ID corresponding to the service identifier of the service requested by the application performed by the user equipment UE by retrieving the access information.

Subsequently, the call processing unit 102 transmits an access request including the determined DCN-ID #1 and APN #1 to the RAN 10 (S401).

Subsequently, the RAN 10 determines the common CPF 30 transmitting the access request based on DCN-ID included in the access request. In the example of FIG. 15, the RAN 10 transmits an access request including APN #1 to the common CPF $30_1$ corresponding to DCN-ID #1 included in the access request (S402).

Subsequently, the call processing unit 302 of the common CPF $30_1$ transmits an access request including APN #1 to the CPF $40_A$ belonging to the NW slice (service #A) specified by DCN-ID received in step S402 (S403). Subsequently, the call processing unit 402 of the common CPF $40_A$ transmits the access request including APN #1 to the UPF $50_A$ in the NW slice (service #A) (S404).

Subsequently, the setting unit 502 of the UPF $50_A$ establishes a communication path of the user data (U-plane) between APN #1 and the user equipment UE (S405).

Next, a processing procedure when the user equipment UE performs the application of service #B is described.

The call processing unit 102 of the user equipment UE determines APN #1 which is the access destination APN and DCN-ID #2 included in the access request based on the access information.

Subsequently, the call processing unit 102 of the user equipment UE transmits an access request including the determined DCN-ID #2 and APN #1 to the RAN 10 (S451). Subsequently, the RAN 10 transmits an access request including DCN-ID #2 and APN #1 to the common CPF $30_1$ corresponding to DCN-ID #2 included in the access request (S452).

Subsequently, the call processing unit 302 of the common CPF $30_1$ transmits an access request including APN #1 to the CPF $40_B$ belonging to the NW slice (service #B) specified by DCN-ID #2 received in step S452 (S453). Subsequently, the call processing unit 402 of the common CPF $40_B$ transmits the access request including APN #1 to the UPF $50_B$ in the NW slice (service #B) (S454).

Subsequently, the setting unit 502 of the UPF $50_B$ establishes a communication path of the user data (U-plane) between APN #1 and the user equipment UE (S455).

In step S401 or S451 of the above-described processing procedure, the user equipment UE may not include APN in the access request. In this case, the CPF 40 recognizes an access destination APN as a default APN. The CPF 40 may query the HSS 20 for the default APN.

In the above-described processing procedure, when only the process related to the U-plane is divided in accordance with the NW slice (that is, when each function implemented in the CPF 40 is implemented in the common CPF 30), the call processing unit 302 of the common CPF $30_1$ directly transmits the access request including APN #1 to the UPF $50_A$ in the NW slice (service #A) in step S403. Similarly, in step S453, the call processing unit 302 of the common CPF $30_1$ directly transmits the access request including APN #2 to the UPF $50_B$ in the NW slice (service #B).

Modified Example of Second Embodiment

As in the first embodiment, the type of user equipment UE may be identified with "DCN-ID" even in the second embodiment.

In this case, the "UE type" is not included in the access information illustrated in FIG. 12, and "DCN-ID," the "service identifier," and "APN" are associated with each other to be stored. Also, the access information includes information which can specify that DCN-ID is DCN-ID allocated to the same common CPF 30.

In FIG. 13, the call processing unit 102 of the user equipment UE transmits an attach request or a tracking area update (TAU) request including "DCN-ID" (for example, which may be default DCN-ID) allocated to the user equipment UE to the RAN 10 (S301). The RAN 10 transmits the attach request or the TAU request received from the user equipment UE to the common CPF (default) $30_{Def}$ (S302). The call processing unit 302 of the common CPF (default) $30_{Def}$ transmits a UE's subscription request including "DCN-ID" to the HSS 20 (S303). The communication unit 201 of the HSS 20 generates "access information" to be reported to the user equipment UE by retrieving the "access information" using information which can specify that DCN-ID is DCN-ID allocated to the same CPF 30 using the "DCN-ID" as a key and transmits a UE's subscription response including the generated access information to the common CPF (default) $30_{Def}$ (S304).

The second embodiment is described above. In the study of 3GPP up to the present, it is assumed that a NW slice is selected using APN. Accordingly, it is not assumed that a plurality of NW slices are configured originally for the same APN. However, in future, it is expected that a system may be required such that a plurality of NW Slices are configured for the same APN, and a NW Slice for establishing a communication path is switched depending on a service. According to the second embodiment, a NW slice is appropriately selected, even if a plurality of NW slices are configured the same APN.

Conclusion

According to an embodiment, a radio communication system includes: user equipment; one or more call control apparatuses configured to perform call control; and a plurality of communication apparatuses configured to process user data. Each of the plurality of communication apparatuses belongs to one of a plurality of groups which are resource division units. The user equipment includes a first communication processing unit that transmits a first access request signal including group specifying information for specifying one group among the plurality of groups and a communication destination identifier indicating a communication destination of the user data to the call control apparatus. The call control apparatus includes a second communication processing unit that transmits a second access request signal including the communication destination identifier included in the first access request signal to the communication apparatus belonging to one group specified with the group specifying information among the plurality of communication apparatuses communicating with the communication destination indicated by the communication destination identifier included in the first access request signal. The communication apparatus includes a setting unit that establishes a communication path of the user data between the communication destination indicated by the communication destination identifier included in the second access request signal and the user equipment. According to the radio communication system, a technology can be provided which is for allowing a NW slice to be appropriately selected when a plurality of NW slices is configured for the same APN.

When a predetermined signal is received from the user equipment, the second communication processing unit may obtain access information associating the group specifying information with the communication destination identifier from a subscriber management apparatus and transmit the obtained access information to the user equipment. The first communication processing unit may determine the group specifying information included in the first access request signal and the communication destination identifier indicating the communication destination of the user data based on the received access information. As a result, the access information including the group specifying information and the communication destination identifier can be reported to (configured in) the user equipment UE.

The group specifying information for specifying one group among the plurality of groups may be an identifier for identifying the call control apparatus. Thus, the NW slice can be uniquely specified using DCN-ID.

According to an embodiment, a communication method is performed by a radio communication system which includes user equipment, one or more call control apparatuses configured to perform call control, and a plurality of communication apparatuses configured to process user data and in which each of the plurality of communication apparatuses belongs to one of a plurality of groups which are resource division units. The method includes: transmitting, by the user equipment, a first access request signal including group specifying information for specifying one group among the plurality of groups and a communication destination identifier indicating a communication destination of the user data to the call control apparatus; transmitting, by the call control apparatus, a second access request signal including the communication destination identifier included in the first access request signal to the communication apparatus belonging to one group specified with the group specifying information among the plurality of communication apparatuses communicating with the communication destination indicated by the communication destination identifier included in the first access request signal; and establishing, by the communication apparatus, a communication path of the user data between the communication destination indicated by the communication destination identifier included in the second access request signal and the user equipment. According to this communication method, there is provided a technology for enabling the NW slice to be appropriately selected when the plurality of NW slices are set in the same APN.

Furthermore, according to the embodiment, there is provided a radio communication system including user equipment, one or more call control apparatuses for performing call control, and a plurality of Network Slice instances for processing user data. The user equipment includes a first communication processor that transmits, to the one or more call control apparatuses, a first access request signal including identifying information for identifying one Network Slice instance of the plurality of Network Slice instances and a communication destination identifier indicating a communication destination of the user data. The one or more call control apparatuses include a second communication processor that transmits, to the one Network Slice instance that communicates with the communication destination indicated by the communication destination identifier included in the first access request signal, a second access request signal including the communication destination identifier included in the first access request signal. The one Network Slice instance includes a setting unit that establishes a communication path of the user data between the communication destination indicated by the communication destination identifier included in the second access request signal and the user equipment. According to this radio communication system, there is provided a technology that allows a NW Slice to be appropriately selected when a plurality of NW Slices is configured for the same APN.

Further, upon receiving a predetermined signal from the user equipment, the second communication processor may obtain access information associating the identifying information with the communication destination identifier from a subscriber management apparatus and transmit the obtained access information to the user equipment. The first communication processor may determine, based on the received access information, the identifying information included in the first access request signal and the communication destination identifier indicating the communication destination of the user data. As a result, the access information including. the identifying information and the communication destination identifier can be reported to (configured in) the user equipment UE.

Further, the identifying information for identifying the one Network Slice instance of the plurality of Network Slice instances may be an identifier for identifying the one or more call control apparatuses. As a result, a NW Slice can be uniquely identified using the DCN-ID.

Further, according to the embodiment, there is provided a communication method executed by a radio communication system including user equipment, one or more call control apparatuses for performing call control, and a plurality of Network Slice instances for processing user data. The method includes transmitting, by the user equipment, a first access request signal including identifying information for identifying one Network Slice instance of the plurality of Network Slice instances and a communication destination identifier indicating a communication destination of the user data; transmitting, by the one or more call control apparatuses, a second access request signal including the communication destination identifier included in the first access request signal to the one Network Slice instance that communicates with the communication destination indicated by the communication destination identifier included in the first access request signal; and establishing, by the one Network Slice instance, a communication path of the user data between the communication destination indicated by the communication destination identifier included in the second access request signal and the user equipment. According to this communication method, a technology can be provided that allows, when a plurality of NW Slices are configured for the same APN, a NW Slice to be appropriately selected.

Supplements of Embodiments

Each aspect/embodiment described in the present specification may be applied to a system in which Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other appropriate systems are used and/or a next generation system extended based on the system.

The order of the processing procedure, the sequence, the flowchart, or the like of each aspect/embodiment described in the present specification may be interchanged unless there is contradiction. For example, in the method described in the present specification, elements of various steps have been proposed in exemplary orders and the invention is not limited to the proposed specific orders.

Input and output information or the like may be stored in a specific location (for example, a memory) or may be managed with a management table. Information or the like to be input and output may be overwritten, updated, or edited. Information or the like to be output may be deleted. Information or the like to be input may be transmitted to another apparatus.

The aspects/embodiments described in the present specification may be singly used, may be combined, or may be switched and used in accordance with execution. In addition, notification of predetermined information (for example, notification of "being X") is not limited to being performed explicitly and may be performed implicitly (for example, the notification of the predetermined information is not performed).

The terms "system" and "network" used in the present specification are compatibly used.

The term "determining" used in the present specification include a wide variety of operations in some cases. The "determining" can include cases in which performing, for example, judging, calculating, computing, processing, deriving, investigating, looking up (for example, looking up in a table, a database, or another data structure), and ascertaining is considered to perform "determining." In addition, the "determining" can include cases in which performing, for example, receiving (for example, receiving information), transmitting (for example, transmitting information), inputting, outputting, and accessing (for example, accessing data in a memory) is considered to perform "determining". In addition, the "determining" can include cases in which performing, for example, resolving, selecting, choosing, establishing, and comparing is considered to be perform "determining." That is, the "determining" can include a case in which any operation is considered to perform "determining."

The description "based on" used in the present specification does not imply "based on only" as long as otherwise mentioned. In other words, the description of "based on" implies both of "based on only" and "based on at least."

When reference to elements in which names "first," "second," and the like used in the present specification are used is made, the amount or order of the elements is not limited generally either. The names can be used in the present specification as methods used to conveniently distinguish two or more elements from each other. Accordingly, reference to first and second elements does not imply that only two elements are employed or a first element is prior to a second element in a certain form.

The terms "including" and "comprising" are intended to be general as in the term "providing" as long as "including," "comprising," and modifications thereof are used in the present specification or the claims. Further, the term "or" used in the present specification or the claims is intended not to be exclusive OR.

Throughout the present disclosure, for example, the article such as a, an, and the in English is added in translation, the article is assumed to include plurality unless indicated that the article is not clear in a context.

Reporting of information is not limited to the aspects/embodiments described in this specification, and may be performed by another method. For example, reporting of information may be implemented by physical layer signaling (e.g., DCI (Downlink Control Information)), UCI (Uplink Control Information)), higher layer signaling (e.g., RRC signaling, MAC signaling, broadcast information (MIB (Master Information Block), SIB (System Information Block)), other signals or a combination thereof. Furthermore, the RRC message may be referred to as RRC signaling. Furthermore, the RRC message may be, for example, an RRC connection setup (RRC Connection Setup) message, an RRC connection reconfiguration (RRC Connection Reconfiguration) message, and so forth.

The decision or determination may be performed by a value (0 or 1) represented by one bit; may be performed by a Boolean value (Boolean: true or false); or by numerical value comparison (e.g., a comparison with a predetermined value).

Note that the terms described in this specification and/or terms required for understanding the specification may be replaced with terms having the same or similar meanings. For example, a channel and/or a symbol may be a signal (signal). Furthermore, a signal may be a message.

The UE may be referred to, by a person skilled in the art, as a subscriber station; a mobile unit; a subscriber unit; a wireless unit; a remote unit; a mobile device; a wireless device; a wireless communication device; a remote device; a mobile subscriber station; an access terminal; a mobile terminal; a wireless terminal; a remote terminal; a handset; a user agent; a mobile client; a client; or some other suitable terms.

The information, signals, etc., described in the specification may be represented by using any of a variety of different techniques. For example, the data, indication, command, information, signal, bit, symbol, chip, etc., may be represented by a voltage, an electric current, an electromagnetic wave, a magnetic field or magnetic particles, a light field or photons, or any combination thereof.

The present invention is described in detail above, and it should be apparent to those skilled in the art that the invention is not limited to the embodiments described in the present specification. The present invention can be implemented as modifications and alternations without departing from the gist and scope of the present invention as defined by the scope of the claims. Accordingly, the description of the present specification is intended to describe examples and does not have any meanings to limit the present invention.

In each embodiment, the common CPF 30 (or the common CPF 30 and the CPF 40) is an example of the call control apparatus. The NW slice specifying information, the service identifier, or the DCN-ID is an example of the group specifying information. The attach request signal or the location update request signal is an example of the predetermined signal.

This international patent application is based upon and claims the benefit of priority of Japanese Patent Application No. 2016-136420 filed on Jul. 8, 2016, and the entire contents of Japanese Patent Application No. 2016-136420 are incorporated herein by reference.

LIST OF REFERENCE SYMBOLS

10 RAN
20 HSS
30 common CPF
40 CPF
50 UPF
60 AS
101 communication unit
102 call processing unit
103 application processing unit
201 communication unit
202 storage unit
301 communication unit
302 call processing unit
401 communication unit
402 call processing unit
501 communication unit
502 setting unit
1001 processor
1002 memory
1003 storage
1004 communication apparatus
1005 input apparatus
1006 output apparatus

The invention claimed is:

1. A radio communication system comprising:
user equipment;
one or more call control apparatuses for performing call control;
a plurality of Network Slice instances for processing user data; and
a subscriber management apparatus,
wherein the plurality of Network Slice instances is configured for a same data network, the same data network being different from a Radio Access Network (RAN),
wherein the user equipment includes a first communication processor that transmits identifying information for identifying one Network Slice instance of the plurality of Network Slice instances and a communication destination identifier indicating the data network,
wherein the one or more call control apparatuses include a second communication processor that transmits the communication destination identifier to the one Network Slice instance identified by the identifying information,
wherein the one Network Slice instance includes a setting unit that establishes a communication path of user data between the data network indicated by the communication destination identifier and the user equipment,
wherein the identifying information is different from the communication destination identifier,
wherein the second communication processor obtains access information, the access information associating the identifying information with the communication destination identifier, from the subscriber management apparatus, and the second communication processor transmits the obtained access information to the user equipment,
wherein the first communication processor determines, based on the obtained access information, the identifying information and the communication destination identifier indicating a destination of the user data, and
wherein the access information includes the identifying information and a service identifier, the service identifier being different from the identifying information, and the communication path of the user data satisfies a requirement of a service identified by the service identifier.

2. A communication method executed by a radio communication system including user equipment, one or more call control apparatuses for performing call control, a plurality of Network Slice instances for processing user data, and a subscriber management apparatus,
wherein the plurality of Network Slice instances is configured for a same data network, and the same data network being different from a Radio Access Network (RAN),
the method comprising:
transmitting, by the user equipment, identifying information for identifying one Network Slice instance of the plurality of Network Slice instances and a communication destination identifier indicating the data network;
transmitting, by the one or more call control apparatuses, communication destination identifier to the one Network Slice instance identified by the identifying information;
establishing, by the one Network Slice instance, a communication path of user data between the data network indicated by the communication destination identifier and the user equipment;
wherein the identifying information is different from the communication destination identifier,
obtaining, by the one or more call control apparatuses, access information, the access information associating the identifying information with the communication destination identifier, from the subscriber management apparatus, and transmitting, by the one or more call control apparatuses, the obtained access information to the user equipment, and
determining, by the user equipment, the identifying information and the communication destination identifier indicating a destination of the user data based on the obtained access information,
wherein the access information includes the identifying information and a service identifier, the service identifier being different from the identifying information, and the communication path of the user data satisfies a requirement of a service identified by the service identifier.

* * * * *